(12) United States Patent
Braat et al.

(10) Patent No.: US 6,472,499 B1
(45) Date of Patent: Oct. 29, 2002

(54) PREPARATION OF HIGH INTRINSIC VISCOSITY POLY(ARYLENE ETHER) RESINS

(75) Inventors: Adrianus J. F. M. Braat, Roosendaal (NL); Hugo G. E. Ingelbrecht, Essen (BE)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/635,040

(22) Filed: Aug. 4, 2000

(51) Int. Cl.$^7$ ................................................ C08G 65/38
(52) U.S. Cl. ..................... 528/215; 528/212; 528/217; 528/486; 528/492; 528/495; 528/497; 528/501
(58) Field of Search ................................ 528/215, 212, 528/217, 486, 492, 495, 497, 501

(56) References Cited

U.S. PATENT DOCUMENTS

| | | |
|---|---|---|
| 3,219,625 A | 11/1965 | Blanchard et al. |
| 3,306,875 A | 2/1967 | Hay |
| 3,384,619 A | 5/1968 | Hori et al. |
| 3,639,656 A | 2/1972 | Bennett |
| 3,642,699 A | 2/1972 | Cooper et al. |
| 3,661,848 A | 5/1972 | Cooper et al. |
| 3,733,301 A | 5/1973 | Modan |
| 3,783,147 A | 1/1974 | Calicchia et al. |
| 3,838,102 A | 9/1974 | Bennett et al. |
| 3,914,266 A | 10/1975 | Hay |
| 4,028,341 A | 6/1977 | Hay |
| 4,039,510 A | 8/1977 | Cooper et al. |
| 4,059,568 A | 11/1977 | Cooper |
| 4,065,434 A | 12/1977 | Rutledge |
| 4,092,294 A | 5/1978 | Bennett, Jr. et al. |
| 4,385,167 A | 5/1983 | Floryan |
| 4,440,923 A | 4/1984 | Bartmann et al. |
| 4,477,649 A | 10/1984 | Mobley |
| 4,477,650 A | 10/1984 | Mobley |
| 4,586,939 A | 5/1986 | Li |
| 4,588,806 A | 5/1986 | Aycock et al. |
| 4,594,405 A | 6/1986 | Haitko |
| 4,618,668 A | 10/1986 | Muench et al. |
| 5,348,569 A | 9/1994 | Bikson et al. |
| 5,693,742 A | 12/1997 | White et al. |

FOREIGN PATENT DOCUMENTS

| | | |
|---|---|---|
| EP | 0 111 722 A1 | 6/1984 |
| EP | 0 111 722 B1 | 6/1984 |
| EP | 0 194 584 | 9/1986 |
| EP | 0 298 531 B1 | 1/1989 |
| EP | 0 417 545 B1 | 8/1990 |
| WO | WO 83/03833 | 11/1983 |

OTHER PUBLICATIONS

Polymerization by Oxidative Coupling V. Catalytic Specificity in the Copper–Amine–catalyzed Oxidation of 2,6–Dimethylphenol by G.F. Endres et al. vol. 28, Dec. 5, 1962, pp. 1300–1305.

The formation of asymmetric hollow fibre membranes for gas separation, using PPE of different intrinsic voscosities: by: J. Smid et al. dated 1991, Journal of Membrane Science, pp. 121–127.

Primary Examiner—Duc Truong

(57) ABSTRACT

Poly(arylene ether) resins having intrinsic viscosities greater than about 0.8 dL/g are produced in the reaction of a phenol with oxygen in the presence of an organic solvent and a metal complex catalyst, the phenol concentration being about 5 to about 15 weight percent of the sum of phenol and solvent, and the molar ratio of metal in the metal complex catalyst to the phenol being about 1:100 to about 1:200.

35 Claims, No Drawings

PREPARATION OF HIGH INTRINSIC VISCOSITY POLY(ARYLENE ETHER) RESINS

BACKGROUND OF THE INVENTION

This invention relates to a process for the preparation of poly(arylene ether) resins. In particular, it relates to a process for preparing high intrinsic viscosity poly(arylene ether) resins.

Commercially available poly(arylene ether) resins typically have number average molecular weights of about 7,000 to about 30,000 and intrinsic viscosities of about 0.25 to about 0.60 deciliters per gram (dL/g) measured in chloroform at 25° C. While high molecular weights are correlated with high intrinsic viscosities, there is no simple conversion between the two measures because of the complex dependence of intrinsic viscosity on the particular molecular weight distribution of a sample. Preparation of poly(arylene ether) resins, including some high intrinsic viscosity resins, is described in commonly assigned U.S. Pat. No. 3,219,625 to Blanchard et al. This reference generally describes the preparation of poly(phenylene ether) resins using copper catalysts with halide, methoxy and pyridino ligands. Example 8 describes the preparation of poly(2,6-dimethylphenylene ether) with an intrinsic viscosity of 1.46 dL/g from a reaction mixture in which the molar ratio of 2,6-dimethylphenol to copper catalyst (calculated per mole of copper atoms) was 13.5.

Commonly assigned U.S. Pat. No. 3,306,875 to Hay generally describes a synthetic method utilizing a tertiary amine-basic cupric salt complex as oxygen-carrying catalyst. Example 11 of this reference demonstrates the preparation of poly(2,6-dimethylphenylene ether) having an intrinsic viscosity of 2.07 dL/g. In this example, the molar ratio of starting material 2,6-dimethylphenol to copper catalyst is 4.05, and the solids content of the reaction mixture is 5.7%.

Commonly assigned U.S. Pat. No. 4,028,341 to Hay generally describes a method of synthesizing poly(phenylene ether) resins wherein the catalyst comprises copper ion, bromide, a secondary diamine and a tertiary amine. Example XIV describes the preparation of a poly(2,6-dimethyl-1,4-phenylene ether) having an intrinsic viscosity of 1.215 dL/g using a molar ratio of phenol to copper of 1100. The methods of this reference are not suitable for large scale manufacturing of polyphenylene ethers due to a variety of factors, including inadequate polymerization rates, irreproducible product molecular weights, decreases in product molecular weight during isolation, and difficulties encountered in product precipitation.

Commonly assigned U.S. Pat. No. 4,092,294 to Bennett, Jr. et al. generally describes a method of synthesizing polyphenylene ethers using a catalyst comprising copper, a secondary diamine, a tertiary amine, a secondary monoamine and a bromine compound. Polyphenylene ethers prepared in the examples exhibited intrinsic viscosities in the range 0.5 to 0.6 dL/g.

U.S. Pat. No. 4,440,923 to Bartmann et al. generally describes a method of producing polyphenylene ethers by reacting a di-ortho-substituted phenol with oxygen in the presence of a copper-amine complex, an activator of a polyvalent alcohol, an alkali or alkaline earth hydroxide, and, optionally, the hydrobromide of a secondary amine. Example 7 in this reference describes the preparation of a poly(2,6-dimethyl-1,4-phenylene ether) with an intrinsic viscosity of 0.72 dL/g using a molar ratio of phenol to copper of 55.0.

A mechanistic study of 2,6-dimethylphenol polymerization by Endres et al. describes the synthesis of polyphenylene ether products with intrinsic viscosities as high as 1.35 dL/g (see G. F. Endres, A. S. Hay, and J. W. Eustance, *Journal of Organic Chemistry*, volume 28, pages 1300–1305 (1963)). Procedures from this reference were employed by Smid et al. to synthesize polyphenylene ethers for use in asymmetric hollow fiber membranes (see J. Smid, J. H. M. Albers, and A. P. M. Kusters, *Journal of Membrane Science*, volume 64, pages 121–128 (1991)). However, the procedures are not suitable for large scale manufacturing of polyphenylene ethers for a variety of reasons, including low reaction rates and low fractional yields of the desired C—O coupling.

European Patent Application No. 298,531 A1 to Albers et al. describes a gas separation apparatus with asymmetric hollow fibers comprising high molecular weight poly(2,6-dimethylphenylene ether)s, particularly poly(2,6-dimethylphenylene ether)s having weight average molecular weights of $10^5$ to $5 \times 10^6$. No guidance is provided for preparing poly(2,6-dimethylphenylene ether)s in this molecular weight range.

U.S. Pat. No. 5,348,569 to Bikson et al. describes modified poly(phenylene ether) based membranes for enhanced fluid separation. Poly(phenylene ether) resins were purified to remove low molecular weight components (leaving a number average molecular weight greater than 25,000), then sulfonated to yield the materials employed in the gas separation membrane.

There remains a need for an economical and readily scalable process to directly afford high molecular weight poly(arylene ether) resins suitable for use in such applications as gas separation.

BRIEF SUMMARY OF THE INVENTION

Poly(arylene ether) resins having intrinsic viscosities not less than 0.8 dL/g are conveniently and economically produced in a process comprising:

reacting oxygen with a phenol in the presence of a metal complex catalyst comprising a catalyst metal to form a poly(arylene ether), wherein the reaction is conducted in an organic solvent, the phenol concentration is about 5 to about 15 weight percent of the sum of phenol and solvent, the molar ratio of catalyst metal to the phenol is about 1:100 to about 1:200, and the phenol has the formula

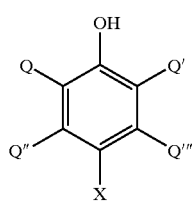

I wherein X is selected from the group consisting of hydrogen, chlorine, bromine and iodine; Q is a monovalent substituent selected from the group consisting of hydrogen, hydrocarbon radicals having from 1 to about 8 carbon atoms, halohydrocarbon radicals having from 2 to about 8 carbon atoms and at least two carbon atoms between the halogen atom and the phenol nucleus, hydrocarbonoxy radicals having from 1 to about 8 carbon atoms, and halohydrocarbonoxy radicals having from 1 to about 8 carbon atoms and at least two carbon atoms between the halogen atom and the phenol nucleus; Q', Q" and Q"' are, independently, selected from the same group as Q and in addition halogen with the proviso that Q, Q', Q" and Q"' are all free of a tertiary alpha carbon atom;

recovering the catalyst metal using an aqueous sequestrant solution; and isolating the poly(arylene ether) by precipitation, wherein the isolated poly(arylene ether) has an intrinsic viscosity greater than about 0.8 dL/g measured at 25° C. in chloroform.

DETAILED DESCRIPTION OF THE INVENTION

A method of preparing poly(arylene ether)s comprises:

reacting oxygen with a phenol in the presence of a metal complex catalyst comprising a catalyst metal to form a poly(arylene ether), wherein the reaction is conducted in an organic solvent, the phenol concentration is about 5 to about 15 weight percent of the sum of phenol and solvent, the molar ratio of catalyst metal to the phenol is about 1:100 to about 1:200, and the phenol has the formula

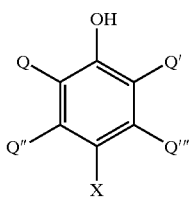

I wherein X is selected from the group consisting of hydrogen, chlorine, bromine and iodine; Q is a monovalent substituent selected from the group consisting of hydrogen, hydrocarbon radicals having from 1 to about 8 carbon atoms, halohydrocarbon radicals having from 2 to about 8 carbon atoms and at least two carbon atoms between the halogen atom and the phenol nucleus, hydrocarbonoxy radicals having from 1 to about 8 carbon atoms, and halohydrocarbonoxy radicals having from 1 to about 8 carbon atoms and at least two carbon atoms between the halogen atom and the phenol nucleus; Q', Q" and Q"' are, independently, selected from the same group as Q and in addition halogen with the proviso that Q, Q', Q" and Q"' are all free of a tertiary alpha carbon atom;

recovering the catalyst metal using an aqueous sequestrant solution; and;

isolating the poly(arylene ether) by precipitation, wherein the isolated poly(arylene ether) has an intrinsic viscosity greater than about 0.8 dL/g measured at 25° C. in chloroform.

Preferred phenols are those according to structure I above in which Q and Q' are hydrocarbon radicals having from 1 to 8 carbon atoms, and Q" and Q"' are hydrogen. Examples of highly preferred phenols include 2,6-dimethylphenol, 2-methyl-6-ethylphenol, 2-methyl-6-allylphenol, 2-methyl-6-phenylphenol, 2,6-dibutylphenol, and 2-methyl-6-propylphenol.

The molecular weight of a poly(arylene ether) resin can be reduced by so-called chain stopper impurities in the phenol starting material. Generally, a chain stopper is a phenol having a non-displaceable substituent in the 4-position. Examples include phenols having alkyl substituents in the 4-position, such as 4-methylphenol (p-cresol) and 2,4-dimethylphenol. It is therefore desirable to reduce the concentration of chain stoppers in order to achieve the highest possible poly(arylene ether) molecular weight. In particular, it is preferred that the total concentration of chain stopper impurities be less than 0.2 weight percent, more preferably less than 0.1 weight percent, yet more preferably less than about 0.07 weight percent, and even more preferably less than about 0.04 weight percent, based on the total weight of phenol.

In the method, oxygen is reacted with a phenol in the presence of a metal complex catalyst. Suitable catalysts for the synthesis of poly(arylene ether) resins include those comprising such catalyst metals as manganese, chromium, copper, and mixtures comprising at least one of the foregoing metals. Among metal complex catalysts, it is preferred to use a copper complex catalyst comprising a secondary alkylene diamine ligand. The copper source for the copper complex comprising a secondary alkylene diamine may comprise a salt of cupric or cuprous ion, including halides, oxides and carbonates. Alternatively, copper may be provided in the form of a pre-formed salt of the alkylene diamine ligand. Preferred copper salts include cuprous halides, cupric halides, and their mixtures. Especially preferred are cuprous bromides, cupric bromides, and their mixtures. It is expressly contemplated to use mixtures of cuprous and cupric salts as described in commonly assigned European Patent Application No. 111,722 to Bennett et al.

As mentioned above, a preferred copper complex catalyst comprises a secondary alkylene diamine ligand. Suitable secondary alkylene diamine ligands are described in commonly assigned U.S. Pat. No. 4,028,341 to Hay and are represented by formula II

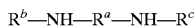

II wherein $R^a$ is a substituted or unsubstituted divalent residue wherein two or three aliphatic carbon atoms form the closest link between the two diamine nitrogen atoms; and $R^b$ and $R^c$ are independently isopropyl or an -tertiary alkyl group having from four to about eight carbon atoms. Examples of $R^a$ include ethylene, 1,2-propylene, 1,3-propylene, 1,2-butylene, 1,3-butylene, 2,3-butylene, the various pentylene isomers having from two to three carbon atoms separating the two free valances, phenylethylene, tolylethylene, 2-phenyl-1,2-propylene, cyclohexylethylene, 1,2-cyclohexylene, 1,3-cyclohexylene, 1,2-cyclopropylene, 1,2-cyclobutylene, 1,2-cyclopentylene, and the like. A highly preferred $R^a$ is ethylene. Examples of $R^b$ and $R^c$ include isopropyl, t-butyl, 2-methyl-but-2-yl, 2-methyl-pent-2-yl, 3-methyl-pent-3-yl, 2,3-dimethyl-buty-2-yl, 2,3-dimethyl-pent-2-yl, 2,4dimethyl-pent-2-yl, 1-methylcyclopentyl, 1-methylcyclohexyl and the like. A highly preferred example of $R^b$ and $R^c$ is t-butyl. An especially preferred secondary alkylene diamine ligand is N,N'-di-t-butylethylenediamine (DBEDA). Suitable molar ratios of copper to secondary alkylene diamine are from about 1:1 to about 1:5, with preferred ratios being from about 1:1 to about 1:3, and highly preferred ratios being from about 1:1.5 to about 1:2.

The preferred copper complex catalyst comprising a secondary alkylene diamine ligand may further comprise a secondary monoamine. Suitable secondary monoamine ligands are described in commonly assigned U.S. Pat. No. 4,092,294 to Bennett et al. and represented by formula III

wherein $R^d$ and $R^e$ are independently alkyl having from 1 to 12 carbon atoms, and preferably alkyl having from 3 to 6 carbon atoms. Examples of the secondary monoamine include di-n-propylamine, di-isopropylamine, di-n-butylamine, di-sec-butylamine, di-t-butylamine, N-isopropyl-t-butylamine, N-sec-butyl-t-butylamine, di-n-pentylamine, bis(1,1-dimethylpropyl)amine, and the like. A highly preferred secondary monoamine is di-n-butylamine (DBA). A suitable molar ratio of copper to secondary monoamine is from about 1:1 to about 1:10, with preferred ratios being from about 1:3 to about 1: 8, and highly preferred ratios being from about 1:4 to about 1:7.

The preferred copper complex catalyst comprising a secondary alkylene diamine ligand may further comprise a tertiary monoamine. Suitable tertiary monoamine ligands are described in the abovementioned Hay U.S. Pat. No. 4,028,341 and Bennett U.S. Pat. No. 4,092,294 patents and include heterocyclic amines and certain trialkyl amines characterized by having the amine nitrogen attached to at least two groups which have a small cross-sectional area, In the case of trialkylamines, it is preferred that at least two of the alkyl groups be methyl with the third being a primary alkyl group having from one to eight carbons or a secondary alkyl group having from three to eight carbon atoms. It is especially preferred that the third substituent have no more than four carbon atoms. A highly preferred tertiary amine is dimethylbutylamine (DMBA). A suitable molar ratio of copper to tertiary amine is from about 1:15 to about 1:100, with preferred ratios being from about 1:20 to about 1:80, and highly preferred ratios being from about 1:20 to about 1:60.

A suitable molar ratio of metal complex catalyst (measured as moles of metal) to phenol is about 1:50 to about 1:400, with about 1:100 to about 1:200 being preferred, and about 1:100 to about 1:180 being more preferred.

The reaction between oxygen and phenol conducted in the presence of a metal complex catalyst may optionally be conducted in the presence of bromide ion. It has already been mentioned that bromide ion may be supplied as a cuprous bromide or cupric bromide salt. Bromide ion may also be supplied by addition of a 4-bromophenol, such as 2,6-dimethyl-4-bromophenol. Additional bromide ion may be supplied in the form of hydrobromic acid, an alkali metal bromide, or an alkaline earth metal bromide. Sodium bromide and hydrobromic acid are highly preferred bromide sources. A suitable ratio of bromide ion to copper ion is about 2 to about 20, with about 3 to about 20 being preferred, and about 4 to about 7 being more preferred.

In the process, the reaction between oxygen and phenol is carried out in an organic solvent. Suitable organic solvents include alcohols, ketones, aliphatic and aromatic hydrocarbons, chlorohydrocarbons, nitrohydrocarbons, ethers, esters, amides, mixed ether-esters, sulfoxides, and the like, providing they do not interfere or enter into the oxidation reaction. The very high molecular weight polyphenylene ethers greatly increase the viscosity of the reaction mixture. Therefore, it is sometimes desirable to use a solvent system that will cause them to precipitate while permitting the lower molecular weight polymers to remain in solution until they form the higher molecular weight polymers. Preferred solvents include aromatic hydrocarbons, and toluene is highly preferred.

A suitable starting concentration of phenol is about 5 to about 15 weight percent, preferably about 6 to about 12 weight percent, more preferably about 6 to about 10 weight percent, based on the total weight of phenol and solvent. All the phenol may be added at the beginning of the reaction. Alternatively, phenol can be added in discrete or continuous amounts during the course of the reaction. Oxygen can be introduced into reaction mixture in pure form or diluted with an inert gas such as nitrogen, helium, argon, and the like. Air can be used as an oxygen source. It is expressly contemplated to control the phenol and oxygen addition rates as described in European Patent Application No. 107,653 A1 so that about ¼ to ¾ of the phenol is in prepolymer state when about ⅓ to ⅔ of the charge of phenol has been added to the reaction mixture.

The reaction between phenol and oxygen may optionally be carried out in the presence of one or more additional components as known in the art, including a lower alkanol or glycol, a small amount of water, or a phase transfer agent. It is generally not necessary to remove reaction product water during the course of the reaction.

Determination of reaction temperature and time are within the skill of those of ordinary skill in the art. Generally, though, an initial temperature of about 25° C. to about 35° C. is suitable, with heating from about 40° C. to about 50° C. after the exothermic portion of the reaction profile. There is no particular limitation on the way the reaction is monitored or terminated. As the reaction proceeds, the increase in the product poly(arylene ether) intrinsic viscosity may be continuously followed by an in-line viscometer. The reaction may be terminated by stopping the oxygen addition when the target intrinsic viscosity is reached. Other suitable methods for terminating the reaction include the addition of a mineral or organic acid, such as acetic acid, or the addition of a sequestrant as described in greater detail below.

There is no particular limitation on the apparatus used to carry out the poly(arylene ether) preparation. The reaction may be carried out both in the batch, semi-batch, or continuous modes. Programmed addition of portions of the phenol at various points in the reaction may be employed. Various types of reactors may be used for the polymerization, including a single stirred tank reactor, two or more continuous stirred tank reactors in series, a bubble column reactor, or a column reactor. In order to minimize formation of byproduct tetramethyldiphenoquinone (TMDQ) and achieve a narrow molecular weight distribution and short reaction times, it is presently preferred to use a semi-batch reactor, two or more continuous stirred tank reactors in series, or a plug-flow bubble column reactor.

The method further comprises recovering the copper catalyst using an aqueous sequestrant solution. Suitable techniques for recovering the catalyst metal from the metal complex catalyst include those described in commonly assigned U.S. Pat. No. 3,838,102 to Bennett et al., U.S. Pat. No. 3,951,917 to Floryan et al., and U.S. Pat. No. 4,039,510 to Cooper et al. These techniques comprise the addition of one or more sequestrants to complex the catalyst metal and facilitate its separation from the poly(arylene ether) product. A preferred method for removing catalyst metal from the poly(arylene ether) product is described in co-pending, commonly assigned U.S. Ser. No. 09/616,737, filed Jul. 14, 2000. This method, which eliminates multiple rinses with a complexing reagent, includes removing the catalyst from the polymerization mixture by mixing the polymerization mixture with a complexing reagent and liquid/liquid centrifuging the multiphase mixture. Water is then added to the polymer phase prior to a subsequent liquid/liquid centrifuge process. In general, suitable sequestrants include polyfunctional carboxylic acid containing compounds, such as citric acid, tartaric acid, nitrilotriacetic acid, ethylenediaminetetraacetic acid, ethylenediaminedisuccinic acid, hydroxyethylethylenediaminetriacetic acid, diethylenetriaminepentaacetic acid, and the like. These sequestrants may be used as their free acids or salts of, for example, their alkali metals, alkaline earth metals, and nitrogenous cations. Preferred sequestrants include nitrilotriacetic acid, ethylenediaminetetraacetic acid and their salts. Suitable molar ratios of sequestrant to catalyst metal are about 1:1 to about 5:1, with about 1.1:1 to about 3:1 being preferred, and about 1:1.5 to about 1:2.5 being more preferred.

The method further comprises isolating the poly(arylene ether) by precipitation. Precipitation of the poly(arylene ether) can be induced by appropriate selection of reaction solvent described above, or by the addition of an anti-solvent to the reaction mixture. Suitable anti-solvents include lower alkanols having one to about ten carbon atoms, acetone and hexane. The preferred anti-solvent is methanol. The anti-solvent can be employed at a range of concentrations relative to the organic solvent, with the optimum concentration depending on the identities of the organic solvent and anti-solvent, as well as the concentration and intrinsic viscosity of the poly(arylene ether) product. It has been discovered that when the organic solvent is toluene and the anti-solvent is methanol, a toluene:methanol weight ratio of about 50:50 to about 80:20 is suitable, with ratios of about 60:40 to about 70:30 being preferred, and about 63:37 to about 67:33 being more preferred. These preferred and more preferred ratios are useful for producing a desirable powder morphology for the isolated poly(arylene ether) resin, without generating either stringy powder or excessive powder fines.

The method may optionally comprise pre-concentrating the reaction mixture prior to addition of the anti-solvent. Although it is not possible to pre-concentrate to as great a degree as for lower intrinsic viscosity poly(arylene ether)s, pre-concentrations of, for example, about 15 weight percent poly(arylene ether) are possible. Any suitable method for pre-concentration may be employed. For example, the pre-concentration may be carried out by preheating the solution above its atmospheric boiling point at a pressure modestly elevated above one atmosphere (so that no boiling takes place in the heat exchanger) followed by flashing the solution to a lower pressure and temperature, whereby vaporization of a substantial part of the toluene takes place and the required heat of vaporization is supplied by the heat transferred in the heat exchanger as sensible heat of the solution.

The method may further comprise functionalization of the product poly(arylene ether). For example, the poly(arylene ether) may be functionalized by known procedures to create additional substituents on at least one of the arylene rings, the substituents comprising —$SO_3H$, —$SO_3M$, —$SO_2R^f$, —$SO_2NHR^f$, —$SO_2N(R^f)_2$, —CORF, —CONHRF, and —$CON(R^f)_2$, where $R^f$ is independently alkyl having from one to four carbon atoms, or aryl having from 6 to 10 carbon atoms; and M is alkali metal, alkaline earth metal, transition metal, $NH_4^+$, primary ammonium ion wherein the alkyl substituent has from one to four carbon atoms, secondary ammonium ion wherein each alkyl substituent independently has from one to four carbon atoms, tertiary ammonium ion wherein each alkyl substituent independently has from one to four carbon atoms, or quaternary ammonium ion wherein each alkyl substituent independently has from one to four carbon atoms. Such functionalized poly(arylene ether)s and techniques for their preparation are described in, for example, U.S. Pat. No. 5,348,569 to Bikson et al.

The process enables production of a poly(arylene ether) having an intrinsic viscosity (as measured in chloroform at 25° C.) greater than about 0.8 dL/g. Alternatively, and depending on its intended end use, the process may produce a poly(arylene ether) having an intrinsic viscosity greater than about 1.0 dL/g, greater than about 1.2 dL/g, greater than about 1.4 dL/g, or greater than about 1.6 dL/g. The process enables reproducible formation of poly(arylene ether) having an intrinsic viscosity within 0.2 dL/g, preferably within 0.1 dL/g, of the target intrinsic viscosity. The process further enables formation of poly(arylene ether) having a copper content less than about 50 parts per million (ppm), more preferably less than about 30 ppm, yet more preferably less than about 15 ppm. The process also enables formation of poly(arylene ether) having a volatiles content less than about 0.5 weight percent. The process produces poly(arylene ethers) with polydispersities typically in the range of about 5 to about 15.

The invention also encompasses articles comprising a poly(arylene ether) made by the above described process. A preferred end use for the high intrinsic viscosity poly(arylene ether)s is the fabrication of asymmetric hollow fiber membranes for gas separation. Methods of preparing asymmetric hollow membranes from poly(phenylene ether) resins of various intrinsic viscosities are described in, for example, J. Smid et al., Journal of Membrane Science, volume 64, pages 121–129 (1991); European Patent No. 298,531 B1 to Albers et al.; and U.S. Pat. No. 5,348,569 to Bikson et al. The poly(arylene ether)s produced by the process are also suitable for, for example, the manufacturing of fibers, films and sheets.

All cited patents and other references are incorporated herein by reference.

The invention is further illustrated by the following non-limiting examples.

EXAMPLE 1

This example provides a procedure for the preparation of a high intrinsic viscosity poly(arylene ether) and is based on the results of several actual experiments. 2,6-Xylenol (200 kg) is dissolved in toluene (23,660 kg) in a reaction vessel. To the xylenol solution is added cuprous bromide in 48 weight percent HBr aqueous solution (105 kg of a solution that was 6.5 weight percent copper), N,N'-dibutylethylenediamine (DBEDA; 125 kg of an about 25–28 weight percent solution in toluene), dimethylbutylamine (DMBA; 237 kg), and di-n-butylamine (DBA; 80 kg). The reaction is conducted as a semi-batch process with the continuous addition of 2,6 xylenol over a period of 45 minutes and addition of oxygen at a rate of about 175 normal cubic meters per hour ($Nm^3$/hr). The rate of oxygen addition is based on oxygen concentration control. The reaction temperature is initially about 30° C., and it is raised to about 45° C. after the reaction exotherm. The end point of the reaction was 10 reached after about 100–120 minutes when an in-line viscosity reading of 1.65 dL/g was attained. At this point, 185 liter of 40 weight percent nitrilotriacetic acid (NTA) solution in water is added, followed by the addition of 1000 liters of water. After 2 hrs agitation at a temperature of about 65° C., the solution is passed though a liquid/liquid centrifuge to separate the aqueous and toluene phases. Precipitation of the high intrinsic viscosity poly(arylene ether) is carried out by addition of methanol to the toluene phase in a stirred tank so that the toluene/methanol weight ratio is about 65:35 and the temperature is about 50° C. The precipitate is filtered, reslurried in a 45:55 toluene/methanol mixture, separated in a solid-liquid extractor, and dried to yield a soft precipitate without large, hard particles. The residual copper content is generally no greater than 15 ppm.

The reaction conditions are summarized in Table 1.

Comparative Example 1

This comparative example describes the preparation of a normal intrinsic viscosity poly(arylene ether) and is based on the results of several actual experiments. The general procedure of Example 1 was followed, but specific reaction conditions are changed as indicated in Table 1. The product has an intrinsic viscosity of 0.46 dL/g.

TABLE 1

|  | Example 1 | Comparison Example 1 |
|---|---|---|
| Toluene | 23660 kg | 19280 |
| Initial 2,6 xylenol | 200 kg | 500 |
| Total 2,6 xylenol | 2000 kg | 6810 |
| Addition time for 2,6 xylenol | 45 min | 45 min |
| Copper catalyst solution (6.5% copper in 48% HBr) | 105 kg | ca. 55 kg |
| DBEDA/toluene | 125 kg | ca. 50 kg |
| DMBA | 237 kg | 193 kg |
| DBA | 80 kg | ca.60 kg |
| reaction temperature | initially about 30° C.; after end exotherm to about 45° C. | initially about 30° C.; after end exotherm to about 45° C. |
| Reaction time to target final IV | ca. 100–120 min | ca. 100–120 min |
| O₂ addition rate | 175 Nm³/hr | 600 Nm³/hr |
| intrinsic viscosity | 1.65 dL/g | 0.46 dL/g |

EXAMPLES 2–4

Three reactions were conducted according to the general procedure of Example 1, varying only in the copper catalyst concentration. Each reaction used 3070 g total toluene, 350 g total 2,6-xylenol (with 35 g 2,6-xylenol added initially), 60 g dimethylbutylamine, 1.4 g of a 50 weight percent solution of dimethyldidecyl ammonium chloride in toluene PTA, and 3.5 g di-n-butylamine. The reaction was run using the times and temperatures of Example 1. Amounts of 6.5 weight cuprous bromide catalyst in 48 weight percent aqueous HBr were 12 grams for Example 2, 15.6 grams for Example 3, and 24 grams for Example 4. The intrinsic viscosities of the product poly(arylene ether)s are given in Table 2 and show that increasing catalyst amounts (i.e., increasing ratio of catalyst to phenol) are associated with increasing intrinsic viscosities.

TABLE

|  | Example 2 | Example 3 | Example 4 |
|---|---|---|---|
| Catalyst amount (ca. 6.5% in 48% HBr) | 12 g | 15.6 g | 24 g |
| Intrinsic Viscosity | 0.89 dL/g | 1.08 dL/g | 1.73 dL/g |

EXAMPLES 5 AND 6

Modifying the general procedure of Example 1 to extend reaction times until the product intrinsic viscosity was no longer increasing, the influence on product intrinsic viscosity of the chain stopper content of the starting 2,6-xylenol was studied. When the 2,6-xylenol contained a total of 0.071 weight percent chain stopper compounds (determined as 0.062 weight percent p-cresol and 0.009 weight percent 2,4-xylenol), an extended reaction time produced a poly (arylene ether) with intrinsic viscosity of 1.80 dL/g. In contrast, when the chain stopper content was limited to 0.035 weight percent of the starting 2,6-xylenol, extended reaction times produced a poly(arylene ether) with intrinsic viscosity of 2.10 dL/g. This example shows that use of a phenol with a low chain stopper content is important to obtaining the highest intrinsic viscosity products.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A process for the preparation of a poly(arylene ether) resin, comprising:

reacting oxygen with a phenol in the presence of a metal complex catalyst comprising a catalyst metal to form a poly(arylene ether), wherein the reaction is conducted in an organic solvent, the phenol concentration is about 5 to about 15 weight percent of the sum of phenol and solvent, the molar ratio of catalyst metal to the phenol is about 1:100 to about 1:200, and the phenol has the formula

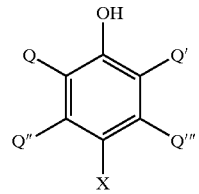

wherein X is selected from the group consisting of hydrogen, chlorine, bromine and iodine; Q is a monovalent substituent selected from the group consisting of hydrogen, hydrocarbon radicals having from 1 to about 8 carbon atoms, halohydrocarbon radicals having from 2 to about 8 carbon atoms and at least two carbon atoms between the halogen atom and the phenol nucleus, hydrocarbonoxy radicals having from 1 to about 8 carbon atoms, and halohydrocarbonoxy radicals having from 1 to about 8 carbon atoms and at least two carbon atoms between the halogen atom and the phenol nucleus; Q', Q" and Q'" are, independently, selected from the same group as Q and in addition halogen with the proviso that Q, Q', Q" and Q'" are all free of a tertiary alpha carbon atom;

recovering the catalyst metal using an aqueous sequestrant solution; and isolating the poly(arylene ether) by precipitation, wherein the isolated poly(arylene ether) has an intrinsic viscosity greater than about 0.8 dL/g measured at 25° C. in chloroform.

2. The process of claim 1, wherein the phenol comprises at least one phenol selected from the group consisting of 2,6-dimethylphenol, 2-methyl-6-ethylphenol, 2-methyl-6-allylphenol, 2-methyl-6-phenylphenol, 2,6-dibutylphenol and 2-methyl-6-propylphenol.

3. The process of claim 1, wherein the total content of chain-stopper impurities in the phenol is less than about 0.06 weight percent based on the total weight of phenol.

4. The process of claim 3, wherein the total content of chain-stopper impurities in the phenol is less than about 0.04 weight percent based on the total weight of phenol.

5. The process of claim 1 wherein the molar ratio of catalyst metal to phenol is about 1:100 to about 1:180.

6. The process of claim 1, wherein the metal complex catalyst comprises a catalyst metal comprising copper.

7. The process of claim 6, wherein the metal complex catalyst further comprises a secondary alkylene diamine ligand of formula II

wherein $R^a$ is a substituted or unsubstituted divalent residue wherein two or three aliphatic carbon atoms form the closest link between the two diamine nitrogen atoms; and $R^b$ and $R_c$ are independently isopropyl or an -tertiary alkyl group having from four to eight carbon atoms.

8. The process of claim 7, wherein the secondary alkylene diamine ligand comprises N,N'-di-tert-butyl-1,2-ethylenediamine.

9. The process of claim 8, wherein the molar ratio of copper to total N,N'-di-tert-butyl-1,2-ethylenediamine is about 1:1.5 to about 1:2.

10. The process of claim 7, wherein the metal complex catalyst further comprises a secondary monoamine of formula III

wherein $R^d$ and $R^e$ are independently alkyl having from 1 to 12 carbon atoms.

11. The process of claim 10, wherein the secondary monoamine comprises di-N-butylamine.

12. The process of claim 11, wherein the molar ratio of total copper to total di-N-butylamine is about 1:4 to about 1:7.

13. The process of claim 7, wherein the metal complex catalyst further comprises a tertiary monoamine.

14. The process of claim 13, wherein the tertiary monoamine comprises dimethylbutylamine.

15. The process of claim 1, wherein the organic solvent comprises at least one solvent selected from the group consisting of benzene, toluene, and xylene.

16. The process of claim 15, wherein the organic solvent comprises toluene.

17. The process of claim 1, wherein the aqueous sequestrant solution comprises nitrilotriacetic acid or ethylenediaminetetraacetic acid.

18. The process of claim 17, wherein the aqueous sequestrant solution comprises nitrilotriacetic acid.

19. The process of claim 18, wherein molar ratio of nitrilotriacetic acid in the aqueous sequestrant solution to catalyst metal is about 1.1:1 to about 3:1.

20. The process of claim 1, further comprising preconcentrating the poly(arylene ether) prior to isolating by precipitation.

21. The process of claim 1, wherein an anti-solvent is used in the precipitation of the poly(arylene ether).

22. The process of claim 21, wherein the anti-solvent comprises at least one compound selected from the group consisting of lower alkanols having one to ten carbon atoms, acetone, and hexane.

23. The process of claim 22, wherein the anti-solvent comprises methanol.

24. The process of claim 23, wherein the precipitation step uses a toluene to methanol weight ratio of about 45:55 to about 65:35.

25. The process of claim 1, further comprising functionalizing the poly(arylene ether) resin to incorporate at least one functional group selected from the group consisting of —$SO_3H$, —$SO_3M$, —$SO_2R^f$, —$SO_2NHR^f$, —$SO_2N(R^f)_2$, —$COR^f$, —$CO_2R^f$, —$CONHR^f$ and —$CON(R^f)_2$, wherein where $R^f$ is, independently, alkyl having from one to four carbon atoms, or aryl having from 6 to 10 carbon atoms; and M is an alkali metal, an alkaline earth metal, a transition metal, $NH_4^+$, primary ammonium ion wherein the alkyl substituent has from one to four carbon atoms, secondary ammonium ion wherein each alkyl substituent independently has from one to four carbon atoms, tertiary ammonium ion wherein each alkyl substituent independently has from one to four carbon atoms, or quaternary ammonium ion wherein each alkyl substituent independently has from one to four carbon atoms.

26. The process of claim 1, wherein the poly(arylene ether) has an intrinsic viscosity greater than about 1.0 dL/g measured in chloroform at 25° C.

27. The process of claim 1, wherein the poly(arylene ether) has an intrinsic viscosity greater than about 1.2 dL/g measured in chloroform at 25° C.

28. The process of claim 1, wherein the poly(arylene ether) has an intrinsic viscosity greater than about 1.4 dL/g measured in chloroform at 25° C.

29. The process of claim 1, wherein the poly(arylene ether) has an intrinsic viscosity greater than about 1.6 dL/g measured in chloroform at 25° C.

30. The process of claim 1, wherein the poly(arylene ether) has a copper content less than about 50 ppm.

31. The process of claim 1, wherein the reaction of oxygen with a phenol in the presence of a metal complex catalyst is conducted in a reactor selected from the group consisting of semi-batch reactors, reactors having two or more continuous stirred reactors in series, and plug-flow bubble column reactors.

32. A poly(arylene ether) resin produced by the process of claim 1.

33. An article comprising a poly(arylene ether) resin produced according to the process of claim 1.

34. A film or membrane comprising a poly(arylene ether) resin produced according to the process of claim 1.

35. An asymmetric hollow fiber comprising a poly(arylene ether) resin produced by the process of claim 1.

* * * * *